Oct. 20, 1931.    E. F. HUDDLE    1,828,370
SLIP CLUTCH
Filed Jan. 19, 1928
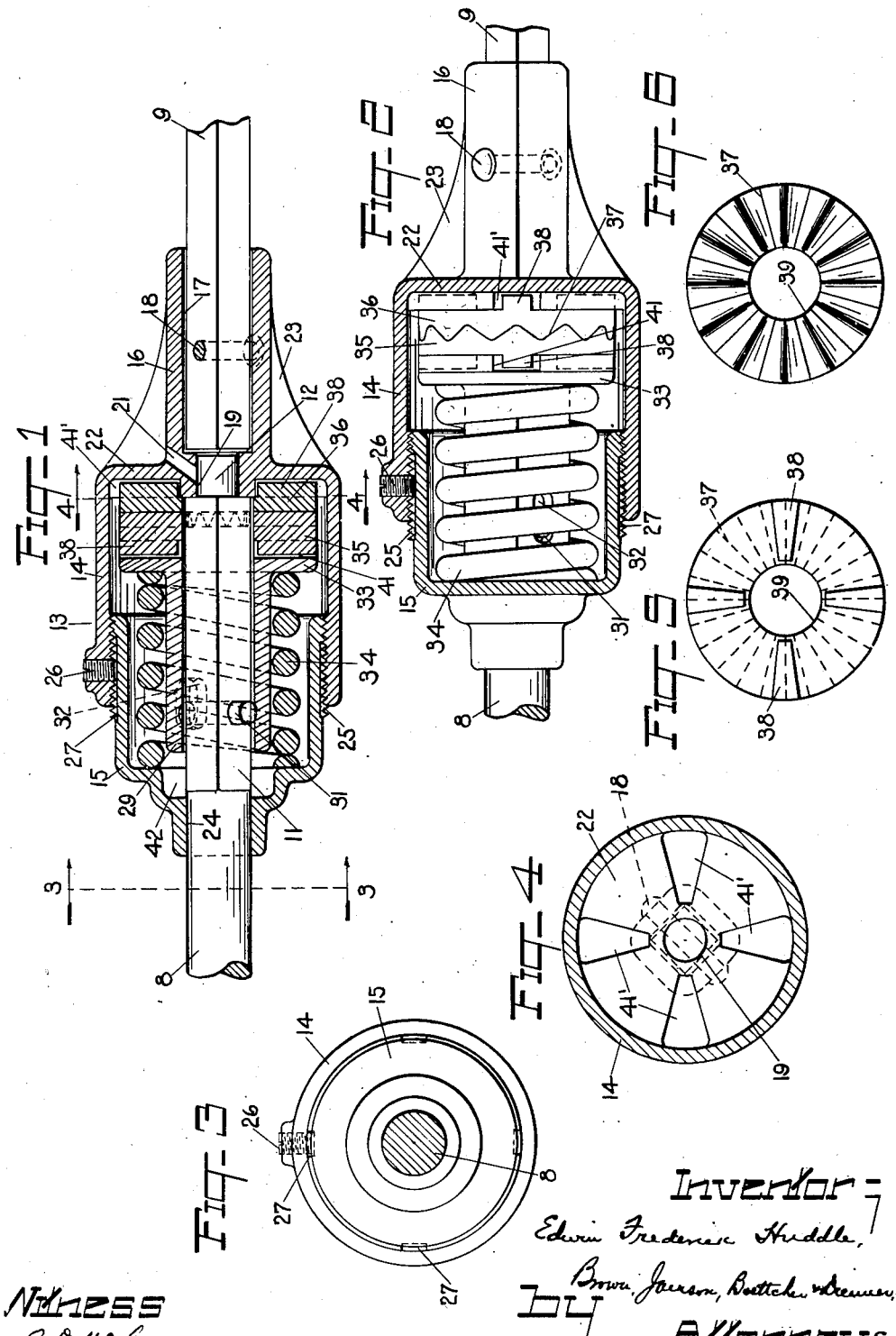

Patented Oct. 20, 1931

1,828,370

UNITED STATES PATENT OFFICE

EDWIN FREDERICK HUDDLE, OF MOLINE, ILLINOIS, ASSIGNOR TO DEERE & COMPANY, OF MOLINE, ILLINOIS, A CORPORATION OF ILLINOIS

SLIP CLUTCH

Application filed January 19, 1928. Serial No. 247,972.

The present invention relates to slip clutches such as are commonly employed in power transmitting connections, where they serve as overload relief devices to prevent breakage of the driving or driven parts in the event of jamming or overloading of the driven mechanism. Such slip clutches have extensive use in agricultural implements for transmitting a safety or overload relief drive to the different operating mechanisms thereof, and the present construction embodies certain features which particularly adapt it to farm implement use.

One of the objects of the invention is to provide a clutch of this general type which is completely enclosed so that there is no possibility of the operator of the implement being injured by the working parts of the clutch, nor of his clothing or any other extraneous material becoming caught in the clutch.

Another object of the invention is to provide a construction of slip clutch in which the spring pressure effective upon the clutch surfaces can be easily and quickly adjusted without the necessity of obtaining access to the interior of the clutch housing.

Another object of the invention is to provide a construction in which the active clutch surfaces can be easily and cheaply renewed in the event of wear or breakage, thereby avoiding the necessity of discarding the clutch, or substituting relatively expensive parts thereof.

Other objects and advantages of the invention will appear in the following description of a preferred embodiment thereof. In the accompanying drawings illustrating such embodiment:

Fig. 1 is a longitudinal sectional view through the clutch.

Fig. 2 is a longitudinal sectional view through the clutch housing with the operating parts of the clutch illustrated in elevation.

Fig. 3 is an end view of the clutch, corresponding to a section taken on the plane of the line 3—3 of Fig. 1.

Fig. 4 is a sectional view of the inner end of the housing, taken approximately on the plane of the line 4—4 of Fig. 1, and with the associated clutch disc removed.

Fig. 5 is an elevational view of the rear side of one of the clutch discs, and

Fig. 6 is a view of the toothed side of the clutch disc.

The clutch is illustrated as being interposed in a line of shafting represented by the two shafts 8 and 9. Either shaft may be regarded as the driving element, but for the purposes of the present description the shaft 8 will be considered as the driving element and the shaft 9 as the driven element. It will be noted that the portion of the driving shaft 8 which is enclosed in the clutch housing is of square or polygonal cross section, as indicated at 11. A short bearing extension 12 projects from the end of the driving shaft 8 to have bearing engagement with the clutch housing and thereby afford a two-point bearing support between the shafts or between the driving shaft and the clutch housing, as will presently appear. The adjacent end of the driven shaft 9 is also of square or polygonal cross section for establishing a secure driven connection with the clutch parts.

Mounted on the two shafts and completely enclosing the active clutch parts is a housing 13 comprising two longitudinally adjustable sections 14 and 15. The section 14 comprises a relatively long, tubular boss or hub 16 at one end thereof, which has a bore 17 of square or polygonal cross section to engage non-rotatably over the driven shaft 9. A pin 18 is preferably extended through the hub 16 and shaft 9 to rigidly secure the same together. Formed at the inner end of the bore 17 is a bearing surface 19 of reduced diameter, in which the bearing extension 12 has snug bearing engagement. A lubricating passage 21 extends down through the hub 16 for supplying lubricant to the bearing surface 19. The hub 16 is joined to the large outer portion of the housing section 14 through a radially extending end wall or flange 22, to the inner side of which the driven clutch disc has coupled connection, as will be presently described. Any suitable arrangement of reinforcing ribs 23 is extended between the end wall 22 and the hub 16.

The other housing section 15 comprises an end hub or boss 24 which has rotative bearing engagement on the cylindrical portion of the drive shaft 8. The housing section 15 extends within the housing section 14, and the engaging surfaces of the two sections are threaded as indicated at 25 to provide for longitudinal adjustment between the sections. It will be evident that by rotating the housing section 15 relatively to the section 14, the length of the housing can be increased or diminished. In order to hold the two sections in any extended or contracted adjustment, a set screw 26 is threaded inwardly through a boss in the outer housing section 14 to engage the inner housing section 15. A plurality of longitudinally extending grooves or depressions 27 are formed at spaced points around the periphery of the housing section 15, in which grooves the set screw 26 is adapted to be seated so that it will not damage the threads 25. Slidably mounted on the driving shaft 8 within the housing 14—15 is a sleeve 29 of square cross section for engaging non-rotatably on the square portion 11 of the shaft. The shifting movement of the sleeve 29 is preferably limited by a pin 31 which passes through the shaft and has its projecting ends disposed in diametrically opposite, longitudinally extending slots 32 formed in the sleeve. Projecting radially from the inner end of the sleeve is a flange or head 33 which carries the driving clutch disc. A heavy compression spring 34 surrounds the sleeve 29 and is confined between the flange or head 33 and the end wall of the housing section 15.

The drive is transmitted from the sleeve 29 to the housing section 14 through the interengagement of two cooperating clutch discs 35 and 36 which are carried by each of said elements. Said clutch discs are substantial duplicates so that one disc may be interchanged for the other. Each disc has its clutch face formed with teeth or serrations 37 which extend radially of the face of the disc, as shown in Fig. 6. Such teeth or serrations are formed as symmetrical projections and indentations having rounded end surfaces and relatively obtuse side surfaces, as shown in Fig. 2. The toothed surfaces, or the entire surfaces of the discs, are preferably case hardened to withstand wear due to friction. The teeth on the opposing clutch faces are adapted to mesh or match with each other, and when so engaged under the pressure of the spring 34 they are capable of transmitting a relatively heavy driving torque. However, when overload slippage does occur, these surfaces will ride over each other without destructive wear or vibration. The rear face of each disc is formed with a plurality of radially extending driving keys or lugs 38 which are preferably spaced equidistantly about the face of the disc, as shown in Fig. 5. These keys or lugs are also preferably tapered on substantially radial lines toward the axial opening 39 in the disc. Such keys or lugs establish driving engagement between the driving disc 35 and the flange 33, and between the driven disc 36 and the end wall or flange 22 of the housing section 14. In the case of the driving disc 35 the keys 38 engage in radially extending recesses or grooves 41 formed in the face of the flange 33. In the case of the driven disc 36 these keys also engage in radially extending pockets or depressions 41' formed in the end wall 22 of the housing. The inter-engaging shoulders formed by the keys or lugs 38 and the recesses 41—41' establish positive driving connection between the clutch discs and the driving and driven parts of the clutch, while still permitting convenient removal of the clutch discs when it is desired to repair the same or to replace the discs.

In the operation of the clutch, the housing 14—15 rotates continuously with the driving shaft 8. When an excessive load is placed upon said shaft, the coacting teeth 37 on the two clutch discs exert a camming action on each other in opposition to the pressure of the spring 34, whereby the sleeve 29 is caused to shift rearwardly to a degree sufficient to permit the teeth of the driving clutch disc 35 to slide over the teeth of the driven clutch disc 36. As shown in Fig. 1, the end wall of the housing section 15 may be provided with an annular recess 42 to provide ample clearance for this shifting movement of the sleeve 29. It will be observed that a two-point bearing support is maintained between the shaft 8 and the housing 14—15, at the bearing surfaces 19 and 24, irrespective of whether the clutch is transmitting driving rotation or is slipping under an overload torque. During the latter condition of operation, the shaft 8 is rotating within the bearing boss 24 of the housing, the latter remaining stationary with the shaft 9. When it is desired to adjust the clutch for slippage at either a higher or lower torque, it is only necessary to release the set screw 26 and to then screw the housing section 15 inwardly or outwardly with reference to the housing section 14, thereby varying the pressure of the spring 34. In the event that one or both of the active clutch surfaces should become worn or broken, the same can be easily and quickly renewed by merely opening the housing and substituting the damaged clutch disc or discs. Hence, wear between the active clutch surfaces does not necessitate replacing the entire clutch, or renewing relatively expensive parts of its construction. The engagement of the pin 31 in the slots 32 serves to prevent displacement of the sleeve 29 from the end of the shaft 8, so that when the housing sections 14 and 15 are screwed apart and the two shafts are moved out of alinement, preparatory to renewing the clutch discs or inspecting the clutch, the sleeve 29 will be held against slipping off the end of the shaft 8.

I claim:

1. In a slip clutch, the combination of driving and driven members, two clutch discs having coacting clutch teeth on their front faces adapted to transmit rotation between said discs, and radially disposed shoulders on the rear faces of said discs adapted to engage releasably with radially disposed shoulders on said members for transmitting rotation between said members and said discs.

2. In a slip clutch, the combination of axially alined driving and driven shafts, flange members extending substantially radially from each of said shafts, one of said flange members being slidable along its shaft, coacting clutch discs disposed between said flange members, the opposing faces of said discs having slip clutch teeth thereon, and radially disposed driving keys on the rear faces of said discs engaging with radial driving shoulders on said flange members.

3. In a slip clutch, the combination of axially alined driving and driven shafts, flange members extending substantially radially from each of said shafts, one of said flange members being slidable along its shaft, a spring bearing against said latter flange member tending to move said flange members together, coacting clutch discs disposed between said flange members, said clutch discs being substantial duplicates and both having matching clutch teeth on their opposing surfaces, and radially extending driving keys projecting from the opposite surfaces of said discs and engaging in radial recesses in said flange members.

4. In a slip clutch, the combination of axially alined driving and driven shafts, a sleeve slidable on one of said shafts, a clutch disc removably mounted on and having clutching engagement with said sleeve, a coacting clutch disc having non-rotative association with the other of said shafts, said latter clutch disc being removably mounted, slip clutch teeth formed in the opposing faces of said clutch discs, a spring coacting with said sleeve for forcing said clutch discs together, and a housing enclosing said clutch discs and said spring, and having bearings for one of said shafts at opposite sides of said sleeve and clutch discs.

5. In a slip clutch, the combination of axially alined driving and driven shafts, a sleeve slidably mounted on the end of one of said shafts, a housing rotating with one of said shafts and extending over said sleeve, said housing providing a two-point bearing support for the other of said shafts, a spring operating to slide said sleeve along the shaft on which it is mounted, a clutch disc having radial shoulders engaging with radial shoulders on said sleeve, and a coacting clutch disc having radial shoulders engaging with radial shoulders in the end of said housing.

6. In a slip clutch of the class described, the combination of axially alined driving and driven shafts, a sleeve slidably mounted on the driving shaft, a housing extending over said sleeve and having non-rotative connection with the driven shaft, a spring confined between one end of said housing and said sleeve for normally tending to move said sleeve toward the other end of said housing, a clutch disc removably mounted on said sleeve, and a coacting clutch disc non-rotatably engaging in the end of said housing, said housing comprising two housing sections adjustable relatively to each other for adjusting the pressure of said spring, and each having a bearing for the driving shaft.

7. In a slip clutch, the combination of axially alined driving and driven shafts, a first housing section non-rotatably secured to the driven shaft, a second housing section having adjustable threaded engagement with said first housing section, said second housing section comprising a bearing surface rotatably engaging the driving shaft, a sleeve slidably mounted on said latter shaft within said housing sections, a flange at one end of said sleeve, a compression spring confined between said flange and the end of said second housing section, and a pair of coacting clutch discs confined between said flange and the end wall of the first housing section, the opposing faces of said clutch discs having clutch teeth thereon, and the opposite surfaces of said discs having radially disposed driving keys projecting therefrom for engaging in radially disposed recesses in said flange and in the end wall of said first housing section.

8. In a slip clutch of the class described, the combination of axially alined driving and driven shafts, a clutch housing comprising first and second housing sections, said first housing section being rigidly secured to said driven shaft, said second housing section having rotative bearing support on said driving shaft, one of said housing sections screwing into the other to permit said housing to be lengthened or shortened, a sleeve mounted on said driving shaft within said housing, a pin projecting from the latter shaft and engaging in a longitudinal slot in said sleeve for limiting sliding movement of said sleeve, a flange on one end of said sleeve, a compression spring confined between said flange and the end wall of said second housing section, a pair of removable clutch discs confined between said flange and the end wall of said first housing section, sloping clutch teeth on the opposing faces of said discs, and radially extending driving keys on the opposite faces of said discs adapted to engage in radially disposed recesses in said flange and in the end wall of said first housing section.

9. In a slip clutch of the class described, the combination of axially alined driving and driven shafts, a clutch housing comprising first and second housing sections, said housing adapted to turn with said driven shaft, bearings in said housing providing a two point journaling support to hold said driving shaft against lateral stresses, flange members extending substantially radially from each of said shafts, one of said flange members being slidable along its shaft, coacting clutch disks disposed between said flange members, said clutch discs having corrugations on their inner faces and radial ribs on their outer faces and being interchangeable on said shafts and in said housing.

10. In a clutch of the class described, the combination of axially alined driving and driven shafts, a clutch housing comprising first and second housing sections, one of said housing sections screwing into the other to permit said housing to be lengthened or shortened, flange members extending substantially radially from each of said shafts, one of said flange members comprising a sleeve, a compression spring on said sleeve and confined between said first housing section and said flange, said sleeve being slidable longitudinally along the driving shaft against the tension of said spring, a pin through said driving shaft and said sleeve to limit the movement of the latter on said shaft, said pin acting to hold the spring and sleeve on said driving shaft when the clutch is dismantled, interchangeable clutch discs disposed between said flange members, said clutch discs cooperating with said flange members against radial movement between the shafts, and matched serrations on the inner faces of said clutch discs for transmitting normal drive therethrough.

11. In a slip clutch of the class described, the combination of axially alined driving and driven shafts, a sleeve slidably mounted on the driving shaft, a housing extending over said sleeve, a spring confined between one end of said housing and said sleeve for normally tending to move said sleeve toward the other end of said housing, removable clutch discs disposed interchangeably between said sleeve and the opposite end of said housing, said discs having coacting serrations on their inner sides and radial keys on their outer sides, said serrations holding said discs against relative rotation under normal driving stresses, and said keys holding the discs in non-rotatable relationship with the sleeve and housing, respectively, said housing comprising two housing sections adjustable relatively to each other for adjusting the pressure of said spring, and each having a bearing for the driving shaft.

12. In a slip clutch of the class described, the combination of axially alined driving and driven shafts, a sleeve slidably mounted on the driving shaft, a housing extending over said sleeve, and having non-rotative connection with the driven shaft, a spring confined between one end of said housing and said sleeve for normally tending to move said sleeve toward the other end of said housing, a clutch disc removably mounted on said sleeve, and a coacting clutch disc non-rotatably engaging in the end of said housing.

13. In a clutch of the class described, the combination of axially alined driving and driven shafts, a sleeve slidably mounted on the driving shaft, a housing extending over said sleeve, a spring confined between one end of said housing and said sleeve for normally tending to move said sleeve toward the other end of said housing, a plurality of removable clutch discs disposed between said sleeve and the opposite end of said housing, said discs being substantially identical and each having coacting serrations on their inner sides and radial keys on their outer sides, said keys holding the discs in non-rotatable relationship with the sleeve and housing, respectively.

In witness whereof, I hereunto subscribe my name this 9th day of January, 1928.

EDWIN FREDERICK HUDDLE.